United States Patent

Strickland, Jr.

[11] 4,234,901
[45] Nov. 18, 1980

[54] PROTECTIVE RELAY APPARATUS

[75] Inventor: William A. Strickland, Jr., Livingston, N.J.

[73] Assignee: Westinghouse Electric Corp., Pittsburgh, Pa.

[21] Appl. No.: 18,706

[22] Filed: Mar. 8, 1979

[51] Int. Cl.³ .............................................. H02H 7/26
[52] U.S. Cl. ......................................... 361/64; 361/68; 361/87
[58] Field of Search ................ 361/64, 66, 68, 69, 361/81, 82, 87

[56] References Cited

U.S. PATENT DOCUMENTS

| | | | |
|---|---|---|---|
| 2,242,950 | 5/1941 | Harder | 361/66 |
| 3,612,952 | 10/1971 | Hagberg | 361/68 |
| 3,849,763 | 11/1974 | Greene, Jr. | |
| 3,882,361 | 5/1975 | Hinman, Jr. | |
| 3,893,008 | 7/1975 | Strickland, Jr. et al. | |
| 3,898,531 | 8/1975 | Hinman, Jr. | |
| 3,986,079 | 10/1976 | Hinman, Jr. et al. | |
| 4,020,396 | 4/1977 | Gambale et al. | 361/64 |

OTHER PUBLICATIONS

"Recent Developments In Relaying Communications Equipment"-Ray Presented to the Fourth Annual Western Protective Relay Conference 10-18-20-77.

Primary Examiner—Harry E. Moose, Jr.
Attorney, Agent, or Firm—D. R. Lacey

[57] ABSTRACT

Protective relay apparatus which performs a segregated phase current comparison of a three-phase protected line section, with a single relay at each end thereof for making the phase current comparison. The single relay includes a rectifier arrangement which provides a signal responsive to the largest phase current of a predetermined polarity, at any instant. In response to a fault detection, it successively phase compares the signals from its rectifier with the signals of the corresponding phases from the rectifier in the relay at the other line end.

6 Claims, 2 Drawing Figures

PROTECTIVE RELAY APPARATUS

BACKGROUND OF THE INVENTION

1. Field of the Invention:

The invention relates in general to protective relay apparatus, and more specifically to protective relay apparatus for protecting a polyphase power line section.

2. Description of the Prior Art:

Certain phase comparison arrangements of the prior art develop local and remote square wave pulse trains from a three-phase network of sequence filters and a mixing transformer. Thus, a single square wave train is produced at each line end, and these pulse trains are phase compared to detect a fault in the protected power line section. Variations of this technique use two separate comparisons, one for the positive sequence, and one for the negative sequence. However, both approaches incorporate sequence networks, and thus both are vulnerable to abnormal frequencies and phase impedance imbalances, which may arise in series compensated transmission lines.

In order to overcome the complexities involved in protecting series compensated transmission lines, a new and improved phase isolated relaying system was developed, such as disclosed in U.S. Pat. No. 3,893,008, which is assigned to the same assignee as the present application. In this system, four separate phase comparison sub-systems are utilized, i.e., three phases and ground, and is thus referred to as segregated phase comparison relaying. This approach overcomes the three major problem area of series compensated lines, i.e., the hereinbefore mentioned abnormal frequencies and phase impedance imbalance, and also the problem of voltage reversal due to the negative reactance of the series capacitor. It is a high-speed system because of angle diversity between the phases, and also due to the elimination of sequence filters. It is inherently redundant because the four sub-systems back up each other. It has the usual advantages of current-only relaying, i.e., it is not responsive to system swings, it is not subject to mutual induction problems, it is unaffected by loss of potential, it relays correctly for zero-voltage, three-phase faults, and it is not affected by potential transients. The phase isolation makes it possible to provide both relay and circuit breaker independent pole protection. Any desired degree of pole tripping selectivity may be provided due to the inherent phase selectivity for all fault types.

The main disadvantage of the isolated phase approach is the requirement for four separate pilot signals and thus four comparison relay units at each end of the protected line. An alternate approach, such as disclosed in U.S. Pat. No. 3,963,964, which is also assigned to the same assignee as the present application, reduces the number of comparison units by phase comparing phasor differences in the current in any two phases, and phase comparing the phasor sum of the current in all three phases. It would also be possible to phase compare the phasor difference in any two phases, and the ground current. However, with either of these approaches, the ability to single pole trip is lost, as it is not possible to determine which pole, or poles, to trip.

It would be desirable to reduce the number of comparison units required, if this reduction can be made without losing the ability to determine which phase (or phases) is faulted.

SUMMARY OF THE INVENTION

Briefly, the present invention is a new and improved protective relay system of the segregated phase type, wherein only one relay unit is required at each end of a protected line section. The arrangement is such that phase identification is not lost, permitting selective pole tripping, if desired.

More specifically, a bridge rectifier at each end of the protected polyphase line section is responsive to the phase currents of the line. The rectifier provides one of three possible signals, assuming a three-phase system, according to which of the three-phase currents is larger at that instant. The specific signal being provided at any instant identifies the phase with the largest instantaneous current, and the width or duration of the signal indicates the length of time, or the electrical degrees, that this phase current was larger than the other two phase currents. Thus, with substantially balanced current flow with no fault in the protective section, the three signals will be developed in the phase sequence A, B and C, with each being 120 electrical degrees in duration (5.55 milliseconds for 60 Hz).

Each relay unit includes means for detecting a fault. In the absence of a fault detection, each relay sends a guard signal to the other relay, preventing a trip from being generated by the phase comparison function of the relay. If a fault is detected by the fault detecting means, the guard signal is terminated, and the phase current signals are each sent to the other relay, as each is developed. Phase comparators compare the three different signals from the remote relay with the three local signals, comparing the signals from like phases. Coincidence in any phase comparator for a predetermined period of time indicates a fault in the protected section, and trip signals are issued to trip the circuit breakers to isolate the protected line section.

Phases with excessive currents, or higher than other phases, will automatically have wider signals than normal, and the signals associated with the phase, or phases with less current, will automatically have narrower signals than normal. This is a desirable feature, as it automatically increases the sensitivity of the comparison function, and it does so in the "suspect" phase or phases.

This variable width signal may also be used advantageously in the fault detecting function. Each signal may be connected to a delay timer, such as a 6/25 timer, for example. If the signal persists for 6 milliseconds, the timer provides a "fault detection", which terminates the guard signal and initiates the phase comparison function.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

U.S. Pat. No. 3,893,008, which is assigned to the same assignee as the present application, is hereby incorporated into this application by reference. This patent discloses certain supervisory control which may be used in the present application for disabling and "arming" the circuit breaker trip function. Thus, these supervisory functions are not described in detail in the present application. Also, the incorporated patent illustrates detailed circuitry which may be used for certain of the functions shown in block form in this application, making it unnecessary to repeat the circuitry in this application.

Figure 1:
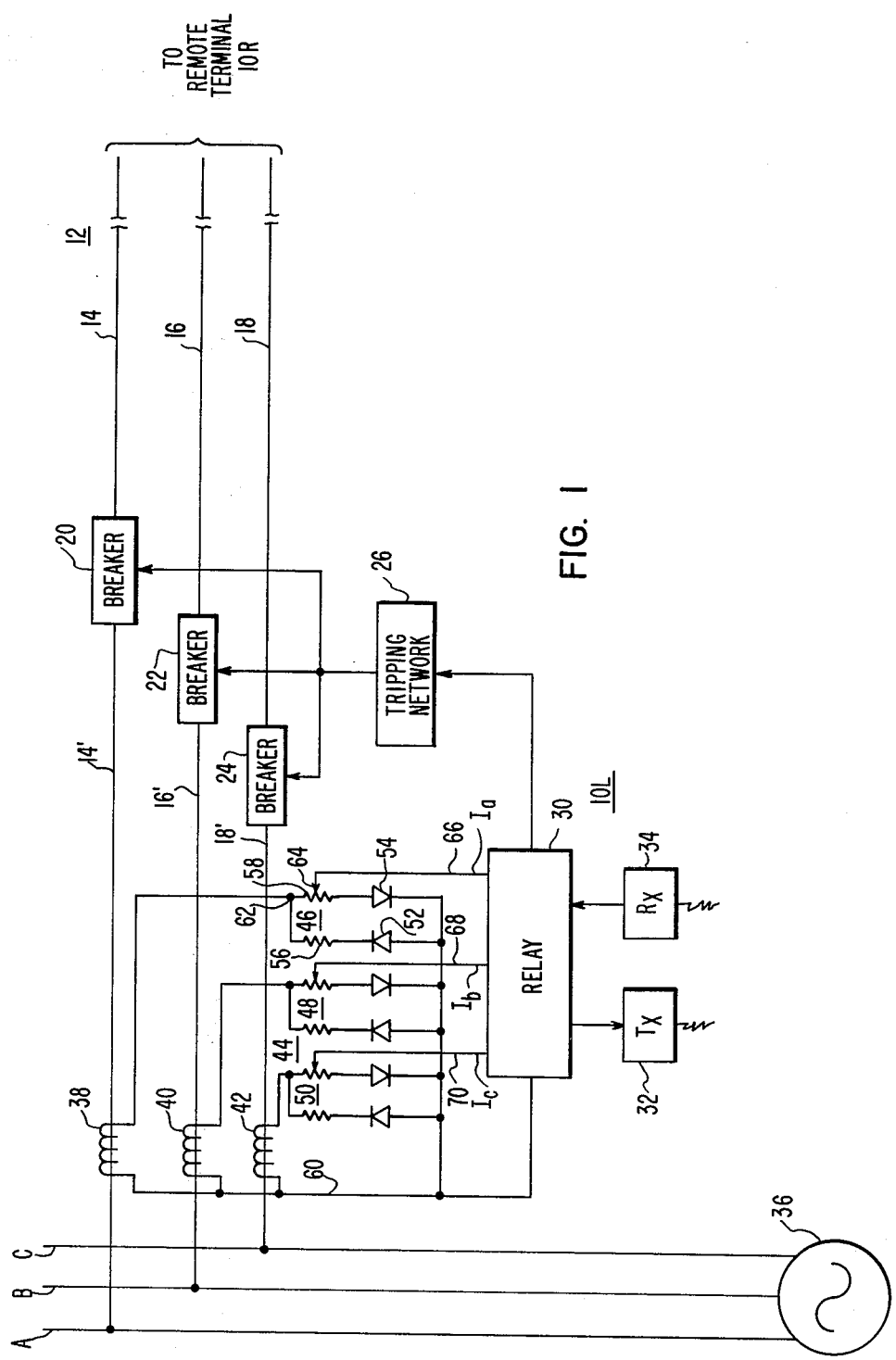
FIG. 1 is a schematic diagram which illustrates protective relay apparatus constructed according to the teachings of the invention, including a three-phase rectifier which may be used to continuously provide one of three possible signals, according to which phase current is the largest in a three-phase system at any instance.

Referring now to the drawings, and to FIG. 1 in particular, there is shown protective relay apparatus 10L for protecting a polyphase electrical transmission line or power line 12. It will be assumed that the protected power line section 12 is a three-phase, 60 Hz system having phase conductors 14, 16 and 18. Power line section 12 extends between local and remote terminals which include local circuit breakers 20, 22 and 24, and remote circuit breakers (not shown), respectively. Protective relay apparatus 10L controls the tripping of the local circuit breakers, and similar protective relay apparatus 10R (not shown) controls the tripping of the remote circuit breakers. The remote terminal may be similar to the local terminal and thus only the local terminal is illustrated in FIG. 1. The local protective relay apparatus 10L and the remote protective relay apparatus 10R monitor the protected power line 12 for a fault. Upon detecting a fault, each relay compares the local phase current related signals with similar remote phase current signals to determine if the detected fault is in the protected power line section 12. If the fault is in the protected section 12, trip signals are generated for the associated circuit breaker trip circuit, such as tripping network 26 for the local breakers 20, 22 and 24, for tripping the local and remote circuit breakers to isolate the fault. Selective pole tripping may be used, if desired, as the present invention identifies the faulted phase, or phases, notwithstanding the use of a single protective relay at each end of the protected section, such as relay 30.

Communication between the local and remote terminals, and thus between protective relay apparatus 10L and 10R, may utilize any convenient form, such as power line carrier, microwave, and leased telephone circuits. The communication apparatus includes a suitable transmitter and receiver at each relay location, such as transmitter 32 and receiver 34 associated with relay 30 at the local terminal. For example, a Westinghouse Type TDS-2400 data transmission system, which multiplexes the phase current signals, and guard state when needed, into a single channel, may be used. The TDS-2400 is described in detail in a paper entitled "Recent Developments in Relaying Communications Equipment", by R. E. Ray, which was presented to the Fourth Annual Western Protective Relay Conference, held Oct. 18–20, 1977.

Circuit breakers 20, 22 and 24 connect the phase conductors 14, 16 and 18 to the phase busses A, B and C associated with a three-phase supply 36 via conductors 14', 16' and 18', respectively.

Intelligence for relay 30 is obtained from current transformers 38, 40 and 42 associated with phase conductors 14', 16' and 18', respectively, and a three-phase rectifier arrangement 44. Rectifier arrangement 44 includes branches 46, 48 and 50 for current transformers 38, 40 and 42, respectively, with branch 46 including solid state diode rectifiers 52 and 54, and resistors 56 and 58. Current transformers 38, 40 and 42 each have one end connected to common conductor 60, and branch 46 extends from conductor 60, back to conductor 60, via serially connected diode 52, resistor 56, resistor 58, and diode 54. Diode 52 has its anode connected to conductor 60, and diode 54 has its cathode connected to conductor 60. Junction 62 between resistors 56 and 58 is connected to the remaining end of current transformer 38. Resistor 58 is tapped at 64. Tap 64 provides a signal $I_a$ for relay 30 via conductor 66. Branches 48 and 50 are similar to branch 46, providing signals $I_b$ and $I_c$ for relay 30 via conductors 68 and 70, respectively.

The rectifier arrangement 44, connected as shown in FIG. 1 to current transformers 38, 40 and 42, provides a current auctioneering circuit in which current will flow in only one branch at any one time, according to which phase has the greatest current at that instant. The tapped resistors provide voltage signals responsive to the current flowing through the diode of its associated sub-branch, providing a signal only when the positive half-cycle of its associated phase current is greater than the positive half-cycles of the other two phase currents. With a balanced three-phase load, each tapped resistor will provide a signal for one-third of a complete electrical cycle, i.e., 120 electrical degrees. Unbalanced loads and fault conditions will lengthen the signals associated with the phases of the greater current, and shorten the signals associated with the phases of the lesser current. This characteristic is used to advantage in the present invention, as will hereinafter be described, along with the fact that only one phase current signal is provided at any instant.

Figure 2:
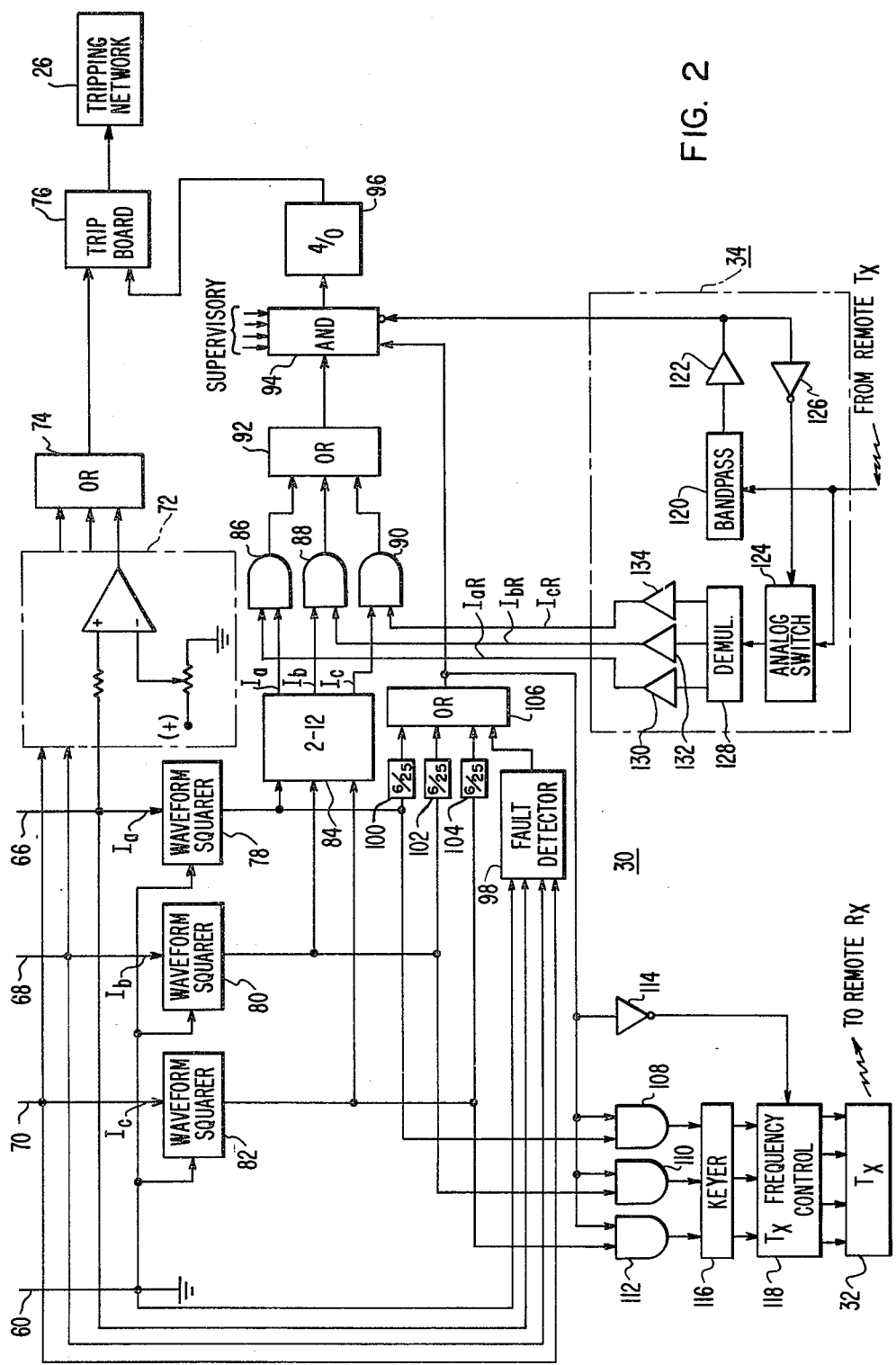
FIG. 2 is a schematic diagram which illustrates a detailed embodiment of a relay unit shown in block form in FIG. 1, which utilizes the signals provided by the rectifier to develop phase current and guard signals.

FIG. 2 is a schematic diagram of a protective relay constructed according to the teachings of the invention, which may be used for relay 30 shown in block form in FIG. 1. Each phase current signal $I_a$, $I_b$ and $I_c$ from rectifier 44 is monitored for an overcurrent condition by a comparator, such as comparator 72 for the phase current in phase conductor 14'. Comparator 72 may be an OP AMP comparator, which changes its output from a logic zero to a logic one when the phase current exceeds a predetermined reference magnitude. Phase current comparators for the other phase currents would be of like construction. The outputs of the comparators used for detecting an overcurrent condition may be connected for selective pole tripping, or, as illustrated, they may be applied to an OR gate 74. The output of OR gate 74 is connected to a trip board 76 which provides a signal for the tripping network 26.

Waveforms of the phase current signals $I_a$, $I_b$, and $I_c$ from rectifier 44 are squared in waveform squaring circuits 78, 80 and 82, respectively, and the squared phase current signals are delayed in a local delay timer 84 in order to compensate for the communications delay in the remote signals which they are to be compared with. The delay provided by the local delay timer 84 is adjustable according to the type of communication used and the distance between the local and remote terminals. A timer having a selectable, adjustable delay between 2 and 12 milliseconds has been found to be suitable.

The squared and delayed local phase current signals $I_a$, $I_b$ and $I_c$ are applied to AND gates 86, 88 and 90 for comparison with the remote phase current signals $I_{ar}$, $I_{br}$ and $I_{cr}$, respectively, which are sent by the remote terminal when the remote terminal detects a fault condition. In like manner, local relay 30 sends the phase current signals $I_a$, $I_b$, and $I_c$ to the remote terminal when relay 30 detects a fault condition. Coincidence between any pair of compared phase current signals indicates that the detected fault condition is in the protected power line section 12.

Coincidence between a pair of compared phase current signals causes the associated AND gate to output a logic one signal to an OR gate 92, and the output of OR gate 92 is applied to a multiple input AND gate 94. AND gate 94 includes the normal supervisory signal inputs described in the incorporated patent. These signals must be in their permissive state in order to "arm" AND gate 94. In addition to these supervisory signals, both the local and remote terminals must detect a fault condition, in order for AND gate 94 to be armed. If AND gate 94 is completely armed, it will output a logic one during the coincidence of a compared pair of phase current signals. A delay timer 96 is connected between the output of AND gate 94 and the trip board 76. Timer 96 has a delay in timing out, such as 4 milliseconds, and an instantaneous reset in the event the output of AND gate 94 is not 4 milliseconds long. Thus, coincidence detected by one of the AND gates 86, 88 and 90 must exist for 4 milliseconds, before such coincidence results in tripping of the associated circuit breakers. Since the AND gates identify the phase, or phases, associated with a fault, selective pole tripping may also be used.

A fault is detected by relay 30 via fault detector function 98. A suitable fault detector of the change type is disclosed in U.S. Pat. No. 3,654,516, but a magnitude or overcurrent type may also be used. In addition to fault detector 98, fault detection may also be made by monitoring the widths of the phase current signals $I_a$, $I_b$ and $I_c$ via delay timers 100, 102 and 104, respectively. The normal width of each phase current signal is 120 electrical degrees, which is 5.55 milliseconds at 60 Hz. The delay timers are set such that normally expected current unbalances will not cause a delay timer 100, 102 or 104 to be timed out, while current unbalances of fault magnitude will cause such timing out. For example, if a current waveform of 130 electrical degrees, or 6 milliseconds, indicates a fault condition for the specific power line to be protected, delay timers may be set at 6/25. The 25 millisecond drop-out delay will hold the signal until the same phase comes around again. The outputs of delay timers 100, 102 and 104 are OR'ed with the output of fault detector 98 in an OR gate 106, and the output of OR gate 106 is applied to an input of AND gate 94. Thus, if no fault is detected, the output of OR gate 106 will be a logic zero, blocking AND gate 94 from providing the logic one output signal to delay timer 96.

Transmitter 32 conveys the information generated at local relay 30 to the remote relay. The logic for transmitter 32 includes dual input AND gates 108, 110 and 112, a NOT gate 114, a keyer 116, and transmitter frequency selector or control 118. The squared signals $I_a$, $I_b$ and $I_c$ are applied to inputs of AND gates 108, 110 and 112, respectively, and the output of OR gate 106 provides the remaining inputs to AND gates 108, 110 and 112. If no fault condition is detected, AND gates 108, 110 and 112 are disabled by the logic zero output of OR gate 106. NOT gate 114 is connected to the output of OR gate 106, and the output of NOT gate 114 is applied to the transmitter frequency control 118. If OR gate 106 outputs a logic zero, NOT gate 114 applies a logic one signal to the transmitter frequency control 118, causing transmitter 32 to transmit a continuous guard signal to the remote terminal. The guard signal may be a tone of a predetermined frequency.

If a fault condition is detected by relay 30, the transmitter frequency control 118 is released to respond to the keyer 116 and AND gates 108, 110 and 112 are enabled to pass its associated phase current signal $I_a$, $I_b$ and $I_c$, respectively. Only one of the AND gates 108, 110 and 112 will output a logic one signal at any instant, and the specific AND gate providing a signal selects the tone frequency to be transmitted by a transmitter 32 via keyer 116 and transmitter frequency selector 118.

The receiver 34 receives a signal from the remote transmitter. A bandpass filter 120 tuned to the center frequency of the remote guard signal detects the presence of the guard signal from the remote terminal. The presence of a guard signal results in a buffer and interface function 122 providing a logic one signal for an inverting input to AND gate 94. Thus, a true guard signal from the remote terminal blocks AND gate 94.

The signal received from the remote terminal is also applied to an analog switch. The control input of the analog switch 124 is responsive to the output of buffer 122 via a NOT gate 126. Thus, if a true guard signal is provided by buffer 122, NOT gate 126 outputs a logic zero to disable analog switch 124.

If the remote terminal detects a fault condition, it terminates its guard signal, AND gate 96 receives an arming signal at its inverting input, and analog switch 124 is rendered conductive, to conduct the signal from the remote transmitter to a de-multiplexing function 128. The de-multiplexing function 128 separates the different tones into three different signals representing the phase currents at the remote terminal. The output of the de-multiplexer 128 is interfaced and buffered in buffers 130, 132 and 134, to provide square wave logic signals $I_{ar}$, $I_{br}$ and $I_{cr}$, respectively, for AND gates 86, 88 and 90, respectively. Thus, AND gates 86, 88 and 90 provide a phase current comparison function. If coincidence is detected between any compared pair of local and remote phase current signals, and AND gate 94 is completely armed by the supervisory signals, and by the detection of a fault condition at the local and remote terminals, a trip signal is provided for the trip board 76 and the tripping network 26, if the coincidence exists for 4 milliseconds, as detected by delay timer 96.

Thus, there has been disclosed new and improved current-only protective relaying apparatus which retains faulted phase identification while utilizing a single relay at each end of a protected line section. Also, each transmitter requires only a single communication channel to transmit phase current information, as only one phase current signal is transmitted at any instant, and when a guard signal is transmitted, no phase current signals are transmitted. In addition to the above advantages, the width of the phase current signals automatically changes with unbalanced currents and/or internal faults, lengthening signals associated with faulted or heavily loaded phases, while shortening those signals associated with unfaulted phases. This provides greater security for unfaulted phases, while increasing the sensitivity for detecting faults in overloaded phases. The signal width may also be monitored as an aid in fault detection.

In addition to the disclosed functions, the protective relay apparatus of the present invention may utilize any appropriate additional functions from the incorporated patent. For example, an additional channel may be provided which is responsive to the ground currents flowing at the local and remote terminals.

I claim as my invention:

1. Protective relay apparatus for protecting a three-phase power line section having first, second and third phase currents flowing between first and second line ends of the protected section, comprising:

first means at each line and providing one of first, second and third signals indicative of the largest of the first, second and third phase currents, respectively, flowing at any instant;

second means at each line end for communicating the first, second and third signals to the other line end;

third means at each line end for phase comparing each of the first, second and third signals from its line end with the like numbered signal from the other line end; and fourth means for isolating the protected section in response to a predetermined phase relationship between any pair of compared signals.

2. The protective relay apparatus of claim 1 including fault detecting means at each line end, each of said fault detecting means preventing the third means at the other line end from performing its phase comparison function until it detects a fault condition.

3. The protective relay apparatus of claim 2 wherein the fault detecting means at each line end prevents the third means of the other line end from performing its comparison function in the absence of a detected fault, by enabling the second means at its line end to communicate the first, second and third signals to the other line end in response to a detected fault.

4. The protective relay apparatus of claim 2 wherein the first, second and third signals each persist while its associated phase current is the largest phase current of a selected polarity, and wherein the fault detecting means includes means responsive to the duration of each of the first, second and third signals.

5. The protective relay apparatus of claim 1 wherein the first means includes current transformer means, rectifier means, and waveform squaring means, with said current transformer means providing signals responsive to the first, second and third phase currents, the rectifier means commutating the current transformer signals to select the largest at any instant, and the waveform squaring means providing the first, second and third signals in response to said rectifier means.

6. The protective relay apparatus of claim 5 wherein the current transformer means includes first, second and third current transformers connected to provide signals in response to the first, second and third phase currents, respectively, with said first, second and third current transformers being connected such that for normal through current, each current transformer signal is out of phase with the current transformer signal at the other line end associated with the same phase, and that for a fault in a phase in the protected section the associated current transformer signals are at least partially in-phase, and wherein the predetermined phase relationship for which the fourth means will isolate the protected section is a predetermined angular coincidence between any pair of compared signals.

* * * * *